United States Patent [19]

Kawanami et al.

[11] 4,214,143
[45] Jul. 22, 1980

[54] CONDUCTOR CONNECTOR IN FLASH WELDING APPARATUS

[75] Inventors: Takao Kawanami, Tohkai; Hiromi Tajiri; Akiyoshi Uomori, both of Amagasaki, all of Japan

[73] Assignees: Mitsubishi Denki Kabushiki Kaisha; Nippon Steel Corporation, both of Tokyo, Japan

[21] Appl. No.: 924,571

[22] Filed: Jul. 14, 1978

[30] Foreign Application Priority Data

Jul. 15, 1977 [JP] Japan .................................. 52/84769

[51] Int. Cl.² ...................... B23K 11/04; H01R 41/00
[52] U.S. Cl. ...................................... 219/97; 219/116; 339/9 R
[58] Field of Search ................ 219/97, 108, 100, 91.1, 219/111, 91.21, 115, 91.22, 116; 339/9 R, 9 E

[56] References Cited

U.S. PATENT DOCUMENTS

| | | | |
|---|---|---|---|
| 2,956,256 | 10/1960 | Sheer | 339/9 R |
| 3,370,149 | 2/1968 | Allen | 219/97 |
| 3,763,344 | 10/1973 | Okabe et al. | 219/116 |
| 4,013,329 | 3/1977 | Hugin | 339/9 E |

FOREIGN PATENT DOCUMENTS 2753215  8/1978  Fed. Rep. of Germany ........... 219/116

Primary Examiner—B. A. Reynolds
Assistant Examiner—Keith E. George
Attorney, Agent, or Firm—Oblon, Fisher, Spivak, McClelland & Maier

[57] ABSTRACT

In a flash welder, instead of using a flexible conductor, the electrical connection to the moveable electrode table is made by a connecting conductor which is slidably connected both to the moveable electrode table and the secondary of the welding transformer. The connecting conductor is mounted on the moveable electrode table in such a manner that, during non-welding periods, it may be retracted within the moveable table, disconnecting it from the transformer and thereby clearing the space between the electrode tables for other workpiece machining operations.

2 Claims, 4 Drawing Figures

CONDUCTOR CONNECTOR IN FLASH WELDING APPARATUS

BACKGROUND OF THE INVENTION

1. Field of the Invention

The present invention relates to a conductor connector in a flash welding apparatus for welding ends of two workpieces.

2. Description of the Prior Art

As shown in FIG. 1, the conventional flash welding apparatus comprises a stationary side electrode table (30) and a movable side electrode table (31) on a common frame (32) and the movable side electrode table (31) is shifted on a guide (37) mounted on a common frame (32) by an up-set cylinder (38), etc.

A transformer (33) for welding is disposed in the common frame (32) and a secondary closed circuit is formed by the secondary winding terminals of the transformer, a flexible conductor (36), the movable side electrode (34) and the stationary side electrode (35). Accordingly, when a trimmer, a rotary shear or a gauge bar is inserted between the movable side electrode table and the stationary side electrode table, during the operations beside the welding operation, the flexible conductor (36) is an obstacle.

In order to allow the shift of the movable side electrode table (31), for enough distance, the length of the flexible conductor (36) is remarkably long whereby the resistance of the secondary closed circuit is increased and a large capacity transformer for welding is required.

SUMMARY OF THE INVENTION

It is an object of the present invention to provide the flash welding apparatus having simplified stationary side and movable side electrode tables which results simple operations beside the welding operation and low impedance by minimizing the secondary closed circuit.

The flash welding apparatus of the present invention comprises a connecting conductor which is disposed in one of the electrode tables in a non-welding time and is pulled out to electrically connect the stationary side electrode table to the movable side electrode table in a welding time. The contact between the connecting conductor and the electrode tables is preferably a sliding contact.

Figure 1:
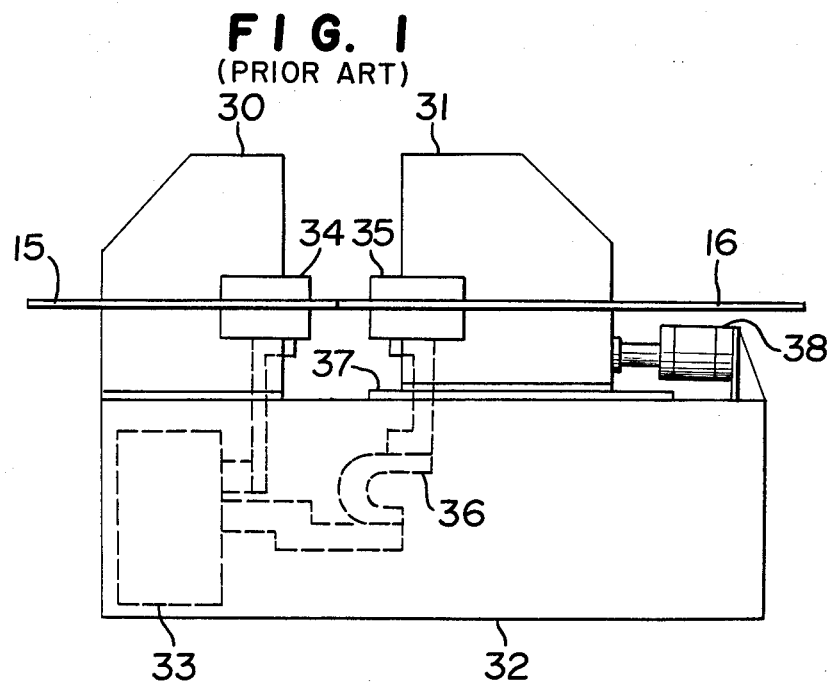
FIG. 1 is a front view of the conventional flash welding apparatus.

DETAILED DESCRIPTION OF THE PREFERRED EMBODIMENTS:

Referring to the drawings, one embodiment of the present invention will be illustrated.

Figure 2:
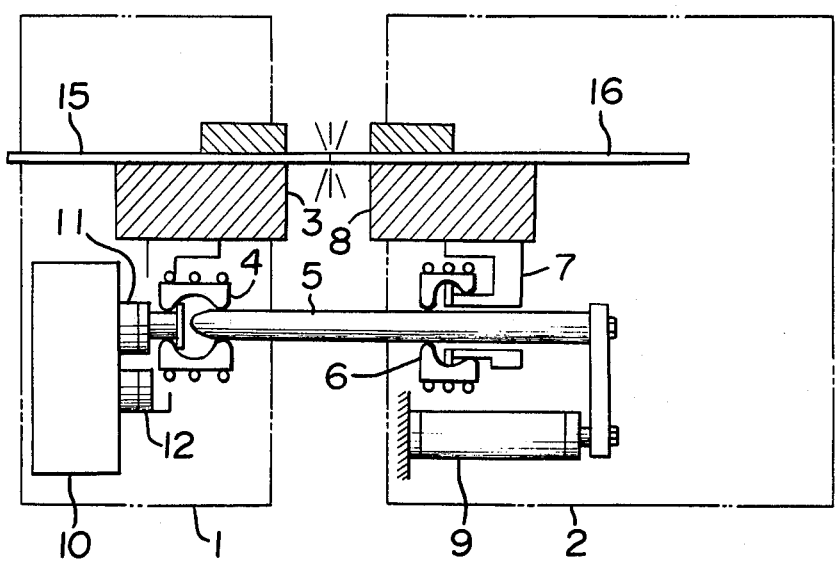
FIG. 2 is a front view of one embodiment of the flash welding apparatus according to the present invention in the welding time.
Figure 3:
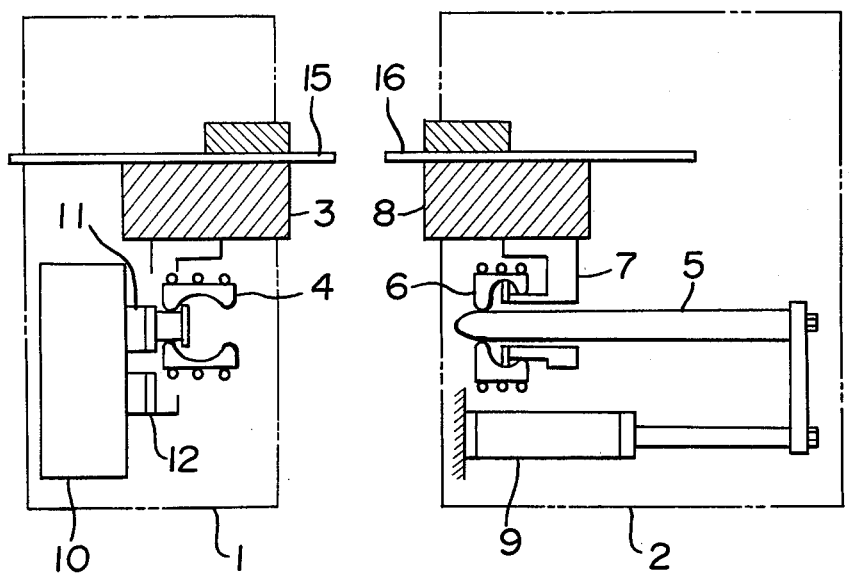
FIG. 3 is a front view of the same embodiment in the non-welding time.
Figure 4:
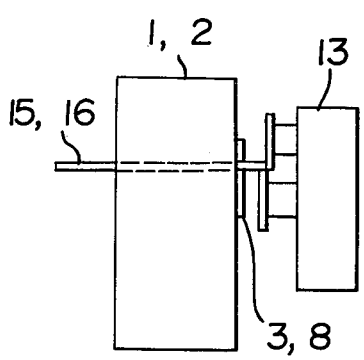
FIGS. 4 and 5 show the operational relations of the positions of the rotary shear and the gauge bar inserted in the other operation beside the welding operation.

FIGS. 2 and 3 are schematic views of one embodiment of the present invention. FIG. 2 shows the condition in the welding time and FIG. 3 shows the condition in the non-welding time.

In FIGS. 2 and 3, a transformer (10) for welding and a sliding conductor (4) are disposed in the stationary side electrode table (1). On the other hand, a skirted sliding conductor (6), a connecting conductor (5) and a cylinder (9) are disposed in the movable side electrode table (2). In the welding time, the connecting conductor (5) is inserted in the sliding connector (4) to electrically connect the stationary side electrode table (1) to the movable side electrode table (2) as shown in FIG. 2.

The current passage from the transformer and the secondary closed circuit are formed as the circuit of transformer secondary terminal (11)-sliding conductor (4)-connecting conductor (5)-skirted sliding conductor (6)-conductor (7)-movable side electrode-workpiece (16)-flash welding point-workpiece (15)-stationary side electrode (3)-conductor-transformer secondary terminal (12).

Figure 5:
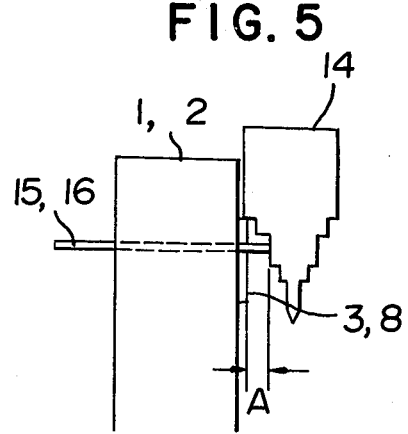

The conductor (5) is disposed in the movable side electrode table (2) by actuating the cylinder (9) as shown in FIG. 3 to prevent an obstacle for operations beside the welding operation, during the time for the operations beside the welding operation such as a processing of a workpiece edge, an insertion of a rotary shear (13) for cutting and an insertion of a gauge bar (14) shown in FIG. 5 for setting a projecting degree (A) required in the flash welding.

In the arrangement of the connecting conductor (5), the condition for the arrangement can be decided under a consideration of physical arrangement and the secondary closed circuit can be minimized whereby it is possible to provide a flash welding apparatus having low impedance and low input.

In the above-mentioned embodiment, the connecting conductor is disposed in the movable side electrode table, however, it is also possible to dispose the connecting conductor in the stationary side electrode table.

In accordance with the present invention, there is not an obstacle during the operations beside the welding operation and the structure of the flash welding apparatus can be simplified. Moreover, the secondary closed circuit can be minimized to be able to give a low impedance whereby a flash welding apparatus having low input can be obtained. Furthermore, there is no flexible part for the connecting conductor whereby the life of the connecting conductor is prolonged. The connecting conductor is shifted to put in and out in each welding operation whereby the dust and stain on the contacting surface of the sliding conductor are removed to maintain the optimum contacting condition.

What is claimed is:

1. A flash welding apparatus comprising:
   a pair of electrode tables which face each other and can be relatively shifted, one of the tables having disposed therein a first electrode, a first sliding conductor, and a transformer for welding, the transformer having a secondary winding, one end of the secondary winding being connected to the first electrode and the other end of the secondary winding being connected to the first sliding conductor, the other of the tables having disposed therein a second electrode, a second sliding conductor connected to the second electrode, and a connecting conductor disposable in the second sliding conductor during a non-welding time to avoid obstructing a space between the pair of electrode tables and capable of being extended and inserted in the first sliding conductor during a welding time to electrically connect both sliding conductors and thereby connect the other end of the secondary winding to the second electrode.

2. The flash welding apparatus recited in claim 1 wherein:
   one of the sliding conductors is skirted.

* * * * *